US009797493B2

(12) United States Patent
Ta et al.

(10) Patent No.: US 9,797,493 B2
(45) Date of Patent: Oct. 24, 2017

(54) ACTUATOR FOR SEAT ADJUSTMENT

(71) Applicant: Johnson Electric S.A., Murten (CH)

(72) Inventors: Jing Ning Ta, Hong Kong (CN); Xue Qian Xu, Shenzhen (CN); Guo Ping Zhang, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 216 days.

(21) Appl. No.: 14/717,124

(22) Filed: May 20, 2015

(65) Prior Publication Data

US 2015/0337932 A1 Nov. 26, 2015

(30) Foreign Application Priority Data

May 20, 2014 (CN) .......................... 2014 1 0214420

(51) Int. Cl.

| | |
|---|---|
| ***F16H 37/12*** | (2006.01) |
| ***F16H 37/04*** | (2006.01) |
| ***F16H 1/20*** | (2006.01) |
| ***F16H 1/32*** | (2006.01) |
| ***B60N 2/02*** | (2006.01) |
| *F16H 25/20* | (2006.01) |

(52) U.S. Cl.

CPC ......... *F16H 37/042* (2013.01); *B60N 2/0232* (2013.01); *F16H 1/203* (2013.01); *F16H 1/32* (2013.01); *F16H 37/12* (2013.01); *B60N 2002/0236* (2013.01); *F16H 2025/2075* (2013.01)

(58) Field of Classification Search

None

See application file for complete search history.

(56) References Cited

U.S. PATENT DOCUMENTS

| | | | | |
|---|---|---|---|---|
| 3,783,712 | A * | 1/1974 | Colinet ..................... | F16H 1/32 475/168 |
| 4,023,440 | A * | 5/1977 | Kennington .............. | F16H 1/32 475/159 |
| 5,470,129 | A | 11/1995 | Ferrero | |
| 6,158,811 | A | 12/2000 | Hofschulte et al. | |
| 7,041,024 | B2 | 5/2006 | Becker et al. | |
| 2004/0220008 | A1* | 11/2004 | Mingishi ................... | F16H 1/32 475/163 |
| 2009/0045661 | A1* | 2/2009 | Stoessel ............... | B60N 2/0232 297/284.4 |

FOREIGN PATENT DOCUMENTS

| | | |
|---|---|---|
| WO | WO 98/36189 | 8/1998 |

* cited by examiner

*Primary Examiner* — Justin Holmes

(74) *Attorney, Agent, or Firm* — Muncy, Geissler, Olds & Lowe, P.C.

(57) ABSTRACT

An actuator for adjusting a seat includes a motor, a gear-box, and an output member. The gear-box includes a casing accommodating a two stage gear train connecting the motor to the output member. The gear train has a first and second transmission mechanisms. The first transmission mechanism includes a worm on a shaft of the motor, and a worm wheel meshed with the worm. The second transmission mechanism is a movable teeth gear transmission mechanism and has an eccentric wheel that rotates with the worm wheel, an internally toothed ring gear fixed to the casing, a fluted disc with radial grooves formed in its outer periphery, and rollers mounted in the radial grooves. The eccentric wheel drives the rollers to mesh with the ring gear to rotate the fluted disc, to drive the output member.

9 Claims, 4 Drawing Sheets

29 30 68 14 44 60 62 42 34 36 50 40 38 46 54 32 28 33 64

ACTUATOR FOR SEAT ADJUSTMENT

CROSS REFERENCE TO RELATED APPLICATIONS

This non-provisional patent application claims priority under 35 U.S.C. §119(a) from Patent Application No. 201410214420.X filed in The People's Republic of China on May 20, 2014, the entire contents of which are hereby incorporated by reference.

FIELD OF THE INVENTION

This invention relates to an actuator and in particular, to an actuator for adjusting a seat of a vehicle.

BACKGROUND OF THE INVENTION

Vehicle seats have actuators to adjust certain attributes such as the height or position of the seat. When the power is turned off, this type of actuator can keep the seat in its position without the need of other devices. This type of actuator has a motor and a gearbox, and requires the gearbox to have a large load carrying capacity and high transmission efficiency. The gearbox has a two stage gear train. The first stage includes a worm and worm wheel. The second stage is a N-N type planetary or epicyclic gear train. FIG. 1 illustrates an N-N type gear train used in a known seat actuator. The N-N type gear train includes an internally toothed ring 1 having an output gear, a shaft 2, an internally toothed ring 3, a planetary gear 4, a bearing 5, an eccentric wheel 6 (inserted in the worm wheel). The internally toothed ring 3 and the planetary gear 4 form an internal mesh N1 there between. The internally toothed ring 1 having the output gear and the planetary gear 4 form an internal mesh N2.

The main problem of the conventional actuator is that the N-N type planetary gear train has a low transmission efficiency and therefore the efficiency of the corresponding gear motor is also low. Another problem of the conventional adjustment device is that the gear-box has a low load carrying capacity. This is because the load is borne by only one or two pairs of gears in the N-N type planetary gear train and there are only a small number of teeth that are in mesh at any time.

SUMMARY OF THE INVENTION

Thus, there is a desire for an actuator for seat adjustment which can address at least one of the problems discussed above.

Accordingly, in one aspect thereof, the present invention provides an actuator for adjustment of a seat, comprising: a motor, a gear-box, and a power output member, the gear-box having a casing accommodating a two stage gear train connecting the motor to the power output member, the two stage gear train comprising a first transmission mechanism comprising a worm fixed on a motor shaft, and a worm wheel meshed with the worm, and a second transmission mechanism comprising a movable teeth gear transmission mechanism.

Preferably, the second transmission mechanism comprises an eccentric wheel arranged to rotate with the worm wheel, an internally toothed ring gear fixed relative to the casing, a first fluted disc with multiple radial grooves formed in its outer periphery, and a plurality of rollers respectively mounted in the radial grooves, the eccentric wheel being configured to drive the rollers to move radially into mesh with the internally toothed ring to rotate the first fluted disc to rotate the power output member.

Preferably, a shockwave plate is disposed about the eccentric wheel and connected to the eccentric wheel through a bearing, the eccentric wheel driving the rollers through the shockwave plate.

Preferably, the bearing is a rolling bearing.

Preferably, a second fluted disc is provided wherein the two fluted discs are respectively located at opposite axial sides of the eccentric wheel, and a bushing is disposed between each of the two fluted discs and the eccentric wheel.

Preferably, the power output member comprises a center shaft, a support portion and an output gear, the support portion is supported by the casing, the center shaft is fixed inside the support portion, and the first fluted disc, the output gear and the support portion are integrally formed with each other as a monolithic structure.

Preferably, the number of teeth of the internally toothed ring gear is less than the number of rollers.

Preferably, a bushing is disposed between the support portion and the casing.

Preferably, the worm wheel and the first fluted disc are coaxially mounted.

Preferably, the first transmission mechanism and the second transmission mechanism cooperatively provide a self-locking feature such that the output gear remains stationary when an external driving force is applied.

Preferably, the reduction ratio of the first transmission mechanism is greater than the reduction ratio of the second transmission ratio.

In another aspect, an actuator for seat adjustment is provided which includes a motor, a gear-box, and a power output member. The gear-box includes a two stage reduction mechanism between the motor and the power output member. A first stage includes a worm fixed on a motor shaft, and a worm wheel meshed with the worm. A second stage includes a movable teeth gear transmission mechanism.

In the above embodiment of the present invention, the movable teeth gear transmission mechanism is used, which can achieve multi-tooth meshing. This provides a greater transmission ratio, and most movable parts are in rolling contact with each other. Therefore, the actuator of the embodiment of the present invention provides greater load carrying capacity and enhanced transmission efficiency under the same size actuator.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
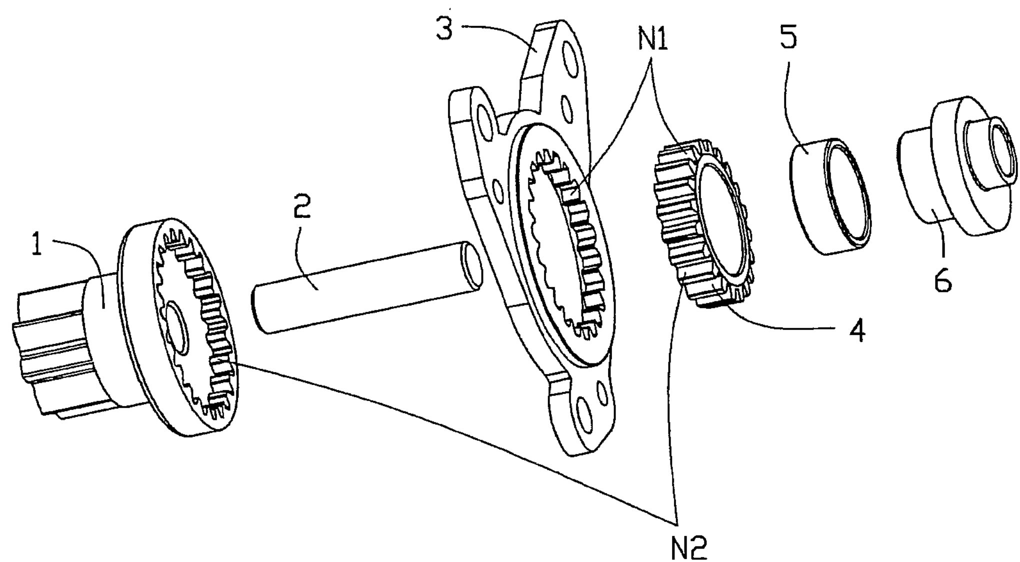
FIG. 1 illustrates an N-N type planetary gear train used in a known seat actuator.
Figure 2:
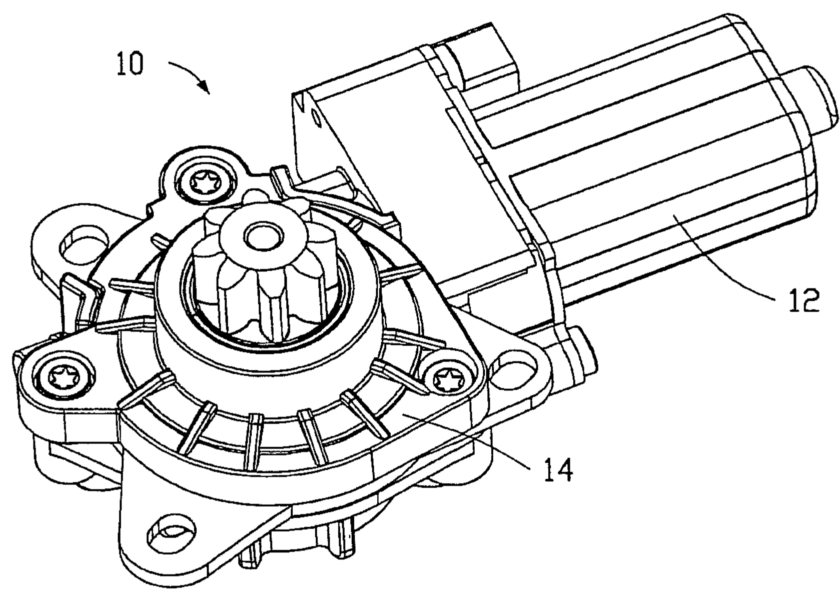
FIG. 2 is an assembled view of a seat actuator according to a first embodiment of the present invention.

FIG. 2 is an assembled view of a seat actuator according to the preferred embodiment of the present invention. As shown, the actuator 10 of this embodiment includes a motor assembly 12 and a gearbox assembly 14.

Figure 3:
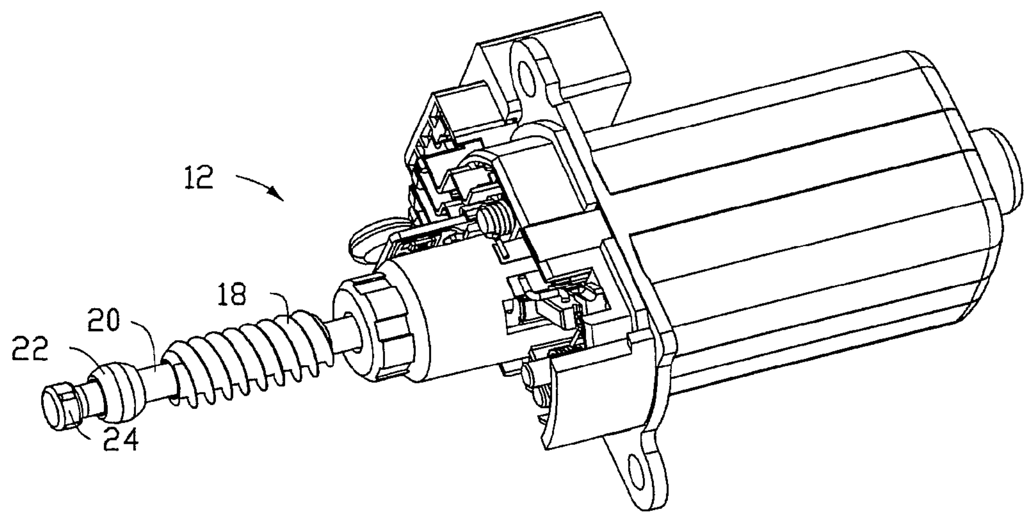
FIG. 3 illustrates a motor assembly of the actuator of FIG. 2.

Referring to FIG. 3, the motor assembly 12 includes a direct current motor 16 having a motor shaft 20. A worm 18 is fixed to a distal end of a motor shaft 20 and rotates with the motor shaft 20. The distal end of the motor shaft 20 is inserted into a casing of the gearbox assembly and rotatably mounted in the casing through a bearing 22 and a thrust bearing 24. A bearing retainer 26 fixes the bearing 22 to the casing 28.

Figure 4:
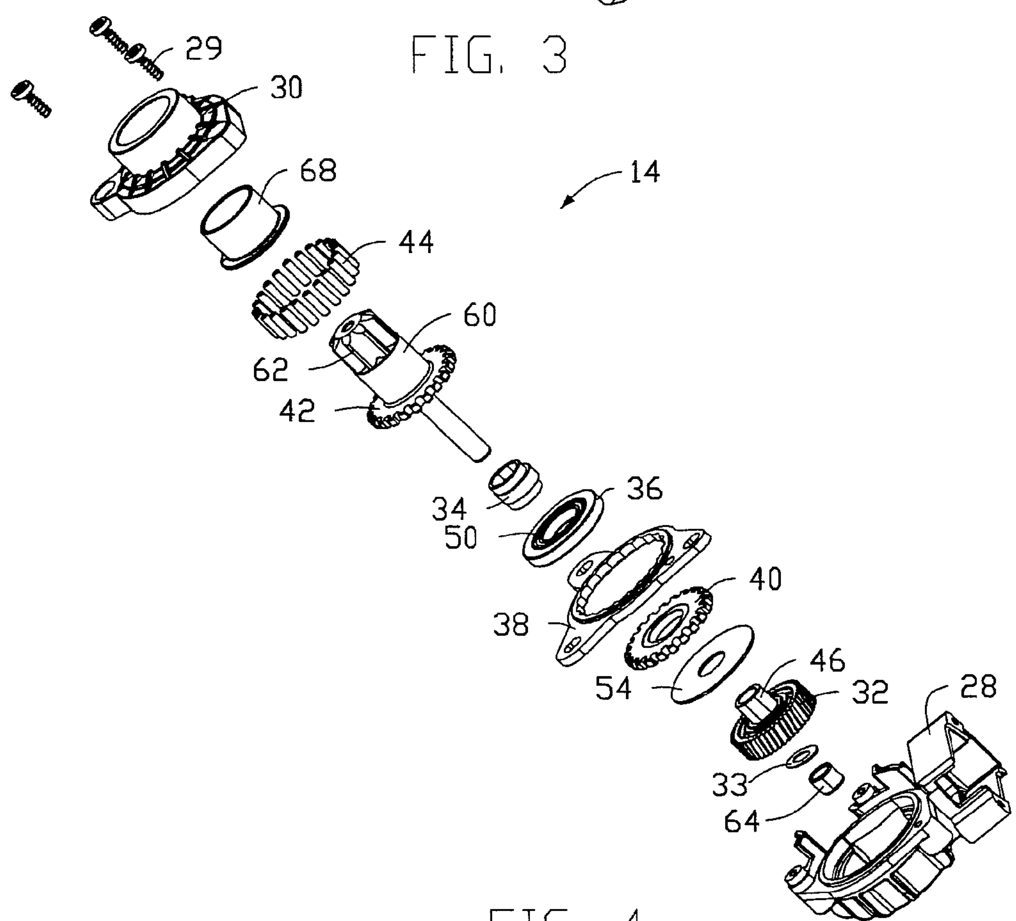
FIG. 4 is an exploded view of a gear-box assembly of the actuator of FIG. 2.
Figure 5:
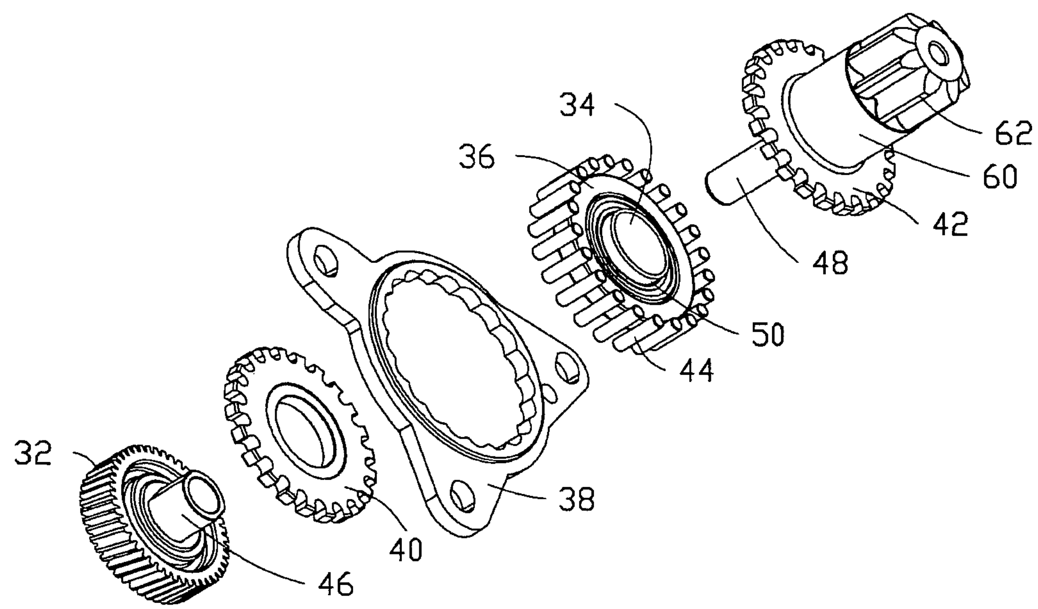
FIG. 5 is an exploded view of a second stage gear train of the gear-box assembly of FIG. 4.

Referring to FIG. 4 and FIG. 5, a gear housing 28 and a housing cover 30 are assembled through a plurality of screws 29 to form the casing of the gear-box assembly 14. A two stage gear train is received within the casing. The worm 18 fixed to the motor shaft 20 and a worm wheel 32 meshed with the worm 18 form the first stage. An eccentric wheel 34 rotating with the worm wheel 32, a shockwave plate 36, an internally toothed ring gear 38, two fluted discs 40, 42, and a plurality of rollers 44 form a full-roller movable teeth transmission structure which acts as the second stage of the gear train. Preferably, the reduction ratio of the first stage is greater than the reduction ratio of the second stage.

Figure 6:
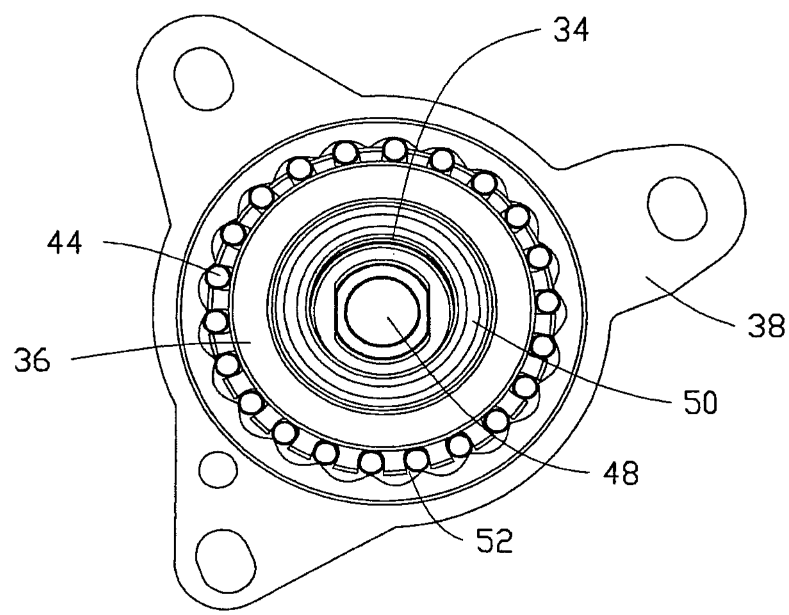
FIG. 6 is a plan view of part of the second stage gear train of FIG. 5.
Figure 7:
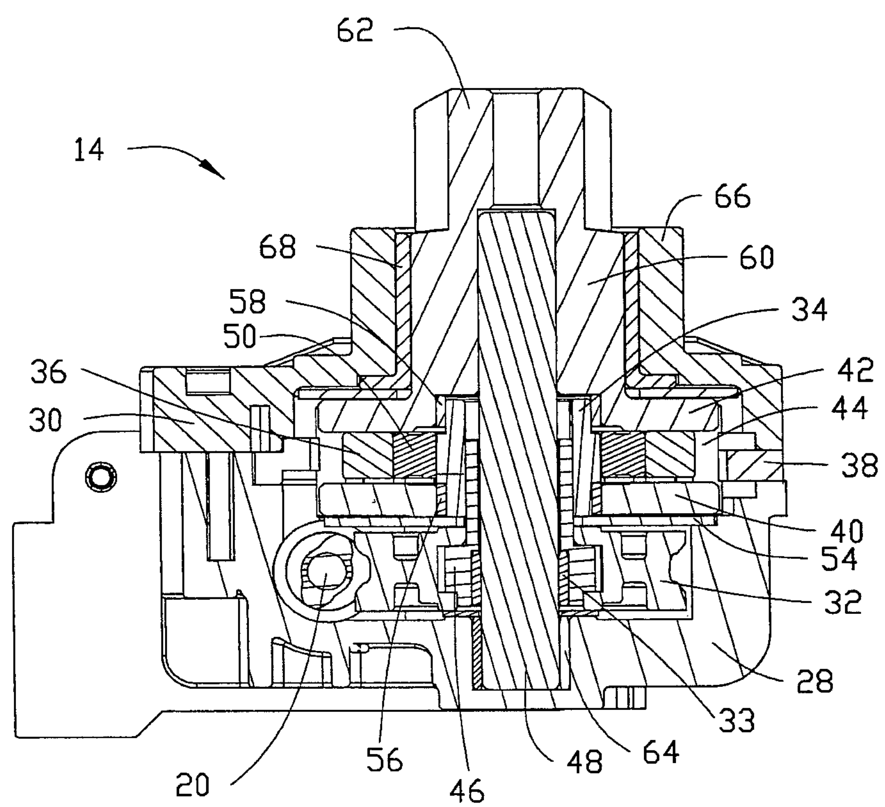
FIG. 7 is a sectional view of the gear-box assembly of the actuator of FIG. 2.

Referring also to FIGS. 6 and 7, a rotary sleeve 46 is fixedly mounted to an inner side of the worm wheel 32. The rotary sleeve 46 is rotatably attached around a center shaft 48. A washer 33 is disposed between the worm wheel 32 and the gear housing 28 for reducing friction. The eccentric wheel 34 is fixedly attached to the rotary sleeve 46 for rotation with the rotary sleeve 46. An outer cylindrical surface of the eccentric wheel 34 is eccentric relative a center of the worm wheel 32. It is to be understood that the eccentric wheel 34 and the worm wheel 32 may be integrally formed together.

A bearing 50 and the shockwave plate 36 are sleeved around the eccentric wheel 34, and the shockwave plate 36 can freely rotate relative to the eccentric wheel 34. In the illustrated embodiment, the shockwave plate 36 is an annular body having a central through hole. Preferably the bearing 50 is a rolling bearing, such as a roller or ball bearing but a bushing may be used. If a bushing is used the shockwave plate may be omitted.

The two fluted discs 40, 42 are respectively disposed at opposite axial sides of the shockwave plate 36. A plurality of radial grooves 52 is evenly formed in an outer circumferential periphery of each of the fluted discs 40, 42. The flute disc 40 is disposed between the shockwave plate 36 and the worm wheel 32, and the flute disc 42 is disposed between the shockwave plate 36 and the housing cover 30.

The internally toothed ring gear 38 is fixed to the gear housing 28 and surrounds the shockwave plate 36, and has inner teeth confronting an outer circumferential periphery of the shockwave plate 36. The rollers 44 are disposed between the shockwave plate 36 and the internally toothed ring 38. Each roller 44 has two opposite axial ends movably supported in a corresponding radial grooves 52 of the fluted discs 40, 42, respectively. The rollers 44 commonly form the movable teeth.

As the eccentric wheel 34 rotates along with the worm wheel 32, the shockwave plate 36 drives the rollers 44 to move radially in the radial grooves 52, such that the rollers 44 are meshed with the internal teeth of the ring gear 38 to thereby rotate the fluted discs 40, 42. A washer 54 is disposed between the fluted disc 40 and the worm wheel 32. Bushings 56, 58 are disposed between the fluted disc 40 and the eccentric wheel 34, and between the fluted disc 42 and the eccentric wheel 34, respectively. The washer 54 and the bushings 56, 58 reduce friction between the parts.

In the illustrated embodiment, the number of the teeth of the internally toothed ring gear 38 is less than the number of radial grooves 52 of the fluted discs 40 and 42, that is, less than the number of rollers 44. Therefore, the meshed rollers move in a circumferential direction with staggered tooth meshing between the discs, which drives the fluted discs with reduced speed. Preferably, the number of the teeth of the internally toothed ring gear 38 is one less than the number of the radial grooves 52 of each fluted disc. If the number of the teeth of the internally toothed ring 38 is twenty one and the number of radial grooves 52 is twenty two, then a reduction ratio of twenty two will be achieved.

The power transmitted by the gear train of the gear-box assembly 14 is outputted through a power output member. In this embodiment, the power output member includes a center shaft support portion 60 and an output gear 62. Preferably, the fluted disc 42, the support portion 60 and the output gear 62 are integrally formed with each other. When rotating, the fluted disc 42 drives the power output member to rotate. The output gear 62 extends axially from one end of the support portion 60, the fluted disc 42 extends radially outwardly from the other end of the support portion 60, and one end of the center shaft 48 is fixed inside the support portion 60. The other end of the center shaft 48 passes through the rotary sleeve 46 and worm wheel 32 and is then rotatably mounted to the gear housing 28 via bearing 64. The output gear 62 is disposed outside the casing for power output. The gear housing cover 30 includes a flange 66 extending axially outwardly, and the support portion 60 is disposed in the flange 66 and supported by the casing. A bushing 68 is disposed between the power output member and the gear-box casing. The bushing 68 has an L-shaped cross-section, which separates the fluted disc 42 and support portion 60 from the gear-box casing, thereby reducing the frictional resistance to the rotation of the fluted disc 42 and the power output member. In the illustrated embodiment, the two stages of transmission mechanism can cooperatively provide a self-locking feature such that the output gear remains stationary when an external driving force is applied.

In the illustrated embodiment, the movable teeth transmission mechanism is used, which can achieve multiple teeth meshing, i.e. multiple rollers are simultaneously meshed with the inner teeth of the internally toothed ring. This provides a greater transmission ratio, and most movable parts are in rolling contact with each other. Therefore, the actuator of the embodiment of the present invention provides greater load carrying capacity and enhanced transmission efficiency for the same size of the actuator. The actuator of the preferred embodiment of the present invention is particularly suitable for use in vehicle seats to adjust the height thereof. The gear train with self-locking capability can prevent the position of the seat from being changed due to an external driving force.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. An actuator for adjustment of a seat, comprising: a motor, a gear-box, and a power output member, the gear-box having a casing accommodating a two stage gear train connecting the motor to the power output member, the two stage gear train comprising a first transmission mechanism comprising a worm fixed on a motor shaft, and a worm wheel meshed with the worm, and a second transmission mechanism comprising a movable teeth gear transmission mechanisms;

wherein the second transmission mechanism comprises an eccentric wheel arranged to rotate with the worm wheel, an internally toothed ring gear fixed relative to the casing, a first fluted disc with multiple radial grooves formed in its outer periphery, and a plurality of rollers respectively mounted in the radial grooves, the eccentric wheel being configured to drive the rollers to move radially into mesh with the internally toothed ring to rotate the first fluted disc to rotate the power output member; and wherein the power output member comprises a center shaft, a support portion and an output gear, the support portion is supported by the casing, the center shaft is fixed inside the support portion, and the first fluted disc, the output gear and the support portion are integrally formed with each other as a monolithic structure.

2. The actuator of claim 1, wherein a shockwave plate is disposed about the eccentric wheel and connected to the eccentric wheel through a bearing, the eccentric wheel driving the rollers through the shockwave plate.

3. The actuator of claim 1, wherein the bearing is a rolling bearing.

4. The actuator of claim 1, further comprising a second fluted disc, wherein the two fluted discs are respectively located at opposite axial sides of the eccentric wheel, and a bushing is disposed between each of the two fluted discs and the eccentric wheel.

5. The actuator of claim 1, wherein the number of teeth of the internally toothed ring gear is less than the number of rollers.

6. The actuator of claim 1, wherein a bushing is disposed between the support portion and the casing.

7. The actuator of claim 1, wherein the worm wheel and the first fluted disc are coaxially mounted.

8. The actuator of claim 1, wherein the first transmission mechanism and the second transmission mechanism cooperatively provide a self-locking feature such that the output gear remains stationary when an external driving force is applied.

9. The actuator of claim 1, wherein the reduction ratio of the first transmission mechanism is greater than the reduction ratio of the second transmission ratio.

* * * * *